US 12,535,487 B2

(12) United States Patent
Frizzell Catledge (10) Patent No.: US 12,535,487 B2
(45) Date of Patent: Jan. 27, 2026

(54) DETECTION OF FUMARATE-DERIVED MODIFICATION IN A TEST SAMPLE

(71) Applicant: UNIVERSITY OF SOUTH CAROLINA, Columbia, SC (US)

(72) Inventor: Norma Frizzell Catledge, West Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 701 days.

(21) Appl. No.: 17/944,813

(22) Filed: Sep. 14, 2022

(65) Prior Publication Data

US 2023/0003736 A1 Jan. 5, 2023

Related U.S. Application Data

(62) Division of application No. 16/639,678, filed as application No. PCT/US2018/046861 on Aug. 17, 2018, now abandoned.

(60) Provisional application No. 62/547,295, filed on Aug. 18, 2017.

(51) Int. Cl.
   *G01N 33/68* (2006.01)
   *C12N 9/48* (2006.01)
   *G01N 27/62* (2021.01)

(52) U.S. Cl.
   CPC ........... *G01N 33/6815* (2013.01); *C12N 9/48* (2013.01); *C12Y 103/01006* (2013.01); *G01N 27/62* (2013.01); *G01N 2440/00* (2013.01); *G01N 2800/285* (2013.01); *G01N 2800/52* (2013.01)

(58) Field of Classification Search
   CPC .............. G01N 33/6815; G01N 27/62; G01N 2440/00; G01N 2800/285; G01N 2800/52; C12N 9/48; C12Y 103/01006
   See application file for complete search history.

(56) References Cited

FOREIGN PATENT DOCUMENTS

WO    WO 2019/036577    2/2019

OTHER PUBLICATIONS

Frizzell et al, "Succination of Thiol Groups in Adipose Tissue Proteins in Diabetes", The Journal of Biological Chemistry vol. 284, No. 38, pp. 25772-25781, Sep. 18, 2009. (Year: 2009).*
Liigand et al, "Think Negative: Finding the Best Electrospray Ionization/MS Mode for Your Analyte" Analytical Chemistry 2017 89 (11), 5665-5668. (Year: 2017).*
Merkley et al, "The Succinated Proteome", Mass Spectrom Rev. 2014 ; 33(2): 98-109. (Year: 2014).*

(Continued)

*Primary Examiner* — Dennis White
(74) *Attorney, Agent, or Firm* — Dority & Manning, P.A.

(57) ABSTRACT

Examination of a test sample to determine the presence or quantity of succination of proteins is described. Examination can be via protein hydrolysis in total succination determination or via enzymatic digestion of isolated proteins and determination of the presence or quantity of modified peptides. The methods can be utilized for determination of excessive succination of lymph system proteins, which can be utilized in prevention or early detection of lymphopenia. Methods can be utilized for test samples of subjects under treatment with dimethyl fumarate suffering from multiple sclerosis. Methods can be utilized as a determination that treatment of the subject with DMF should be slowed or stopped.

17 Claims, 3 Drawing Sheets (56) References Cited

OTHER PUBLICATIONS

Stoof et al, "The antipsoriatic drug dimethylfumarate strongly suppresses chemokine production in human keratinocytes and peripheral blood mononuclear cells", British Journal of Dermatology 2001; 144: 1114-1120. (Year: 2001).*
Nagai et al, "Succination of Protein Thiols during Adipocyte Maturation", The Journal of Biological Chemistry vol. 282, No. 47, pp. 34219-34228, Nov. 23, 2007 (Year: 2007).*
Blewett et al, "Chemical proteomic map of dimethyl fumarate sensitive cysteines in primary human T cells" Sci Signal.; 9(445), pp. 1-25. (Year: 2016).*
Adam, et al. "Renal cyst formation in Fh1-deficient mice is independent of the Hif/Phd pathway: role of Nrf2 signaling and fumarate mediated succination of KEAP1" *Canc. Cell* 20 (2011) pp. 524-537.
Alderson, et al. "S-(2-Succinyl)cysteine: A Novel Chemical Modification of Tissue Proteins by a Krebs Cycle Intermediate" *Arch. Biochem. Biophys.* 450 (2006) pp. 1-8.
Arnold, et al. "Magnetization Transfer Ratio in the Delayed-Release Dimethyl Fumarate DEFINE Study" *J. Neurol.* 261 (2014) pp. 2429-2437.
Bardella, et al. "Aberrant succination of proteins in fumarate hydratase-deficient mice and HLRCC patients is a robust biomarker of mutation status" *J. Pathol.* 225 (2011) pp. 4-11.
Blatnik, et al. "Inactivation of glyceraldehyde-3-phosphate dehydrogenase by fumarate in diabetes: formation of S-(2-succinyl)cysteine, a novel chemical modification of protein and possible biomarker of mitochondrial stress" *Diabetes* 57 (2008) pp. 41-49.
Blewett, et al. "Chemical proteomic map of dimethyl fumarate-sensitive cysteines in primary human T cells" *Sci. Signal.* 9 (2016) pp. 1-11.
Bomprezzi, R. "Dimethyl fumarate in the treatment of relapsing-remitting multiple sclerosis: an overview" *Ther. Adv. Neurol. Disord.* 8 (2015) pp. 20-30.
Brennan, et al. "Pharmacodynamics of dimethyl fumarate are tissue specific and involve NRF2-dependent and -independent mechanisms" *Antioxid. & Redox Signal.* 24 (2016) pp. 1058-1071.
Chen, et al. "Hereditary leiomyomatosis and renal cell carcinoma syndrome-associated renal cancer: recognition of the syndrome by pathologic features and the utility of detecting aberrant succination by immunohistochemistry" *Am. J. Surg. Pathol.* 38 (2014) pp. 627-637.
De Jong, et al. "Selective stimulation of T helper 2 cytokine responses by the anti-psoriasis agent monomethylfumarate" *Eur. J. Immunol.* 26 (1996) pp. 2067-2074.
Fox, et al. "Characterizing absolute lymphocyte count profiles in dimethyl fumarate-treated patients with MS" *Neurol. Clin. Pract.* 6 (2016) pp. 220-229.
Fox, et al. "BG-12 (dimethyl fumarate): a review of mechanism of action, efficacy, and safety" *Curr. Med. Res. Opin.* 30 (2014) pp. 251-262.
Fox, et al. "Placebo-controlled phase 3 study of oral BG-12 or glatiramer in multiple sclerosis" *N. Engl. J. Med.* 367 (2012) pp. 1087-1097.
Frizzell, et al. "Mitochondrial stress causes increased succination of proteins in adipocytes in response to glucotoxicity" *Biochem. J.* 445 (2012) pp. 247-254.
Frizzell, et al. "Succination of thiol groups in adipose tissue proteins in diabetes: succination inhibits polymerization and secretion of adiponectin" *J. Biol. Chem.* 284 (2009) pp. 25772-25781.
García-Caballero, et al. "Dimethylfumarate inhibits angiogenesis in vitro and in vivo: a possible role for its antipsoriatic effect?" *J. Invest. Dermatol.* 131 (2011) pp. 1347-1355.
Ghods, et al. "Beneficial actions of the anti-inflammatory dimethyl fumarate in glioblastomas" *Surg. Neurol. Int.* 4 (2013) pp. 1-6.
Ghoreschi, et al. "Fumarates improve psoriasis and multiple sclerosis by inducing type II dendritic cells" *J. Exp. Med.* 208 (2011) pp. 2291-2303.

Giraudon, et al. "Insight into the role of CRMP2 (collapsin response mediator protein 2) in T lymphocyte migration: the particular context of virus infection" *Cell. Adh. Migr.* 7 (2013) pp. 38-43.
Gold, et al. "Efficacy and safety of delayed-release dimethyl fumarate in patients newly diagnosed with relapsing-remitting multiple sclerosis (RRMS)" *Mult. Scler. J.* 21 (2015) pp. 57-66.
Gold, et al. "Placebo-controlled phase 3 study of oral BG-12 for relapsing multiple sclerosis" *N. Engl. J. Med.* 367 (2012) pp. 1098-1107.
Guan, et al. "MicroRNA let-7e is associated with the pathogenesis of experimental autoimmune encephalomyelitis" *Eur. J. Immunol.* 43 (2013) pp. 104-114.
Guan, et al. "CD44 Reciprocally regulates the differentiation of encephalitogenic Th1/Th17 and Th2/regulatory T cells through epigenetic modulation involving DNA methylation of cytokine gene promoters, thereby controlling the development of experimental autoimmune encephalomyelitis" *J. Immunol.* 186 (2011) pp. 6955-6964.
Havrdova, et al. "Oral BG-12 (dimethyl fumarate) for relapsing-remitting multiple sclerosis: a review of DEFINE and CONFIRM" *Exp. Opin. Pharmac.* 14 (2013) pp. 2145-2156.
Höxtermann, et al. "Fumaric acid esters suppress peripheral CD4- and CD8-positive lymphocytes in psoriasis" *Dermatology* 196 (1998) pp. 223-230.
Kappos, et al. "Quality of life outcomes with BG-12 (dimethyl fumarate) in patients with relapsing remitting multiple sclerosis: the DEFINE study" *Mult. Scler.* 20 (2014) pp. 243-252.
Lee, et al. "The fumaric acid ester BG-12: a new option in MS therapy" *Exp. Rev. Neurother.* 13 (2013) pp. 951-958.
Lehmann-Horn, et al. "PML during dimethyl fumarate treatment of multiple sclerosis: How does lymphopenia matter?" *Neurology* 87 (2016) pp. 440-441.
Lehmann, et al. "Dimethylfumarate induces immunosuppression via glutathione depletion and subsequent induction of heme oxygenase 1" *J. Invest. Dermatol.* 127 (2007) pp. 835-845.
Linker, et al. "Fumaric Acid Esters Exert Neuroprotective Effects in Neuroinflammation via Activation of the Nrf2 Antioxidant Pathway" *Brain* 134 (2011) pp. 678-692.
Manuel, et al. "Adipocyte protein modification by Krebs cycle intermediates and fumarate ester derived succination" *Amino Acids* 45 (2013) pp. 1243-1247.
Merkley, et al. "The succinated proteome" *Mass Spectr. Rev.* 33 (2014) pp. 98-109.
Minowa, et al. "Proteomic analysis of the small intestine and colon epithelia of adenomatous polyposis coli gene-mutant mice by two-dimensional gel electrophoresis" *Electrophoresis* 21 (2000) pp. 1782-1786.
Mrowietz, et al. "Treatment of psoriasis with fumaric acid esters: results of a prospective multicentre study" *Br. J. Dermatol.* 138 (1998) pp. 456-460.
Nagai, et al. "Succination of Protein Thiols During Adipocyte Maturation: A Biomarker of Mitochondrial Stress" *J. Biol. Chem.* 282 (2007) pp. 34219-34228.
Piroli, et al. "Identification of protein succination as a novel modification of tubulin" *Biochem. J.* 462 (2014) pp. 231-245.
Reyes, et al. "Uterine smooth muscle tumors with features suggesting fumarate hydratase aberration: detailed morphologic analysis and correlation with S-(2-succino)-cysteine immunohistochemistry" *Mod. Pathol.* 27 (2014) pp. 1020-1027.
Rosenkrantz, et al. "PML in a Patient with Lymphocytopenia Treated with Dimethyl Fumarate" *N. Engl. J. Med.* 372 (2015) pp. 1476-1478.
Rouse, et al. "Indoles mitigate the development of experimental autoimmune encephalomyelitis by induction of reciprocal differentiation of regulatory T cells and Th17 cells" *Br. J. Pharmacol.* 169 (2013) pp. 1305-1321.
Schmidt, et al. "Fumaric acid diesters deprive cultured primary astrocytes rapidly of glutathione" *Neurochem. Int.* 57 (2010) pp. 460-467.
Schulze-Topphoff, et al. "Dimethyl fumarate treatment induces adaptive and innate immune modulation independent of Nrf2" *PNAS* 113 (2016) pp. 4777-4782.

(56) References Cited

OTHER PUBLICATIONS

Sheremata, et al. "Dimethyl fumarate for treating relapsing multiple sclerosis" *Exp. Opin. Drug Saf.* 14 (2015) pp. 161-170.
Ternette, et al. "Inhibition of mitochondrial aconitase by succination in fumarate hydratase deficiency" *Cell. Rep.* 3 (2013) pp. 689-700.
Thomas, et al. "Tissue Distribution of S-(2-succinyl)cysteine (2SC), a Biomarker of Mitochondrial Stress in Obesity and Diabetes" *Obesity* 20 (2012) pp. 263-269.
Treumer, et al. "Dimethylfumarate is a potent inducer of apoptosis in human T cells" *J. Invest. Dermatol.* 121 (2003) pp. 1383-1388.
Wiśniewski, et al. "Universal sample preparation method for proteome analysis" *Nat. Meth.* 6 (2009) pp. 359-362.

\* cited by examiner

FIG. 1

| Protein Name | SEQ ID NO | Modified Sequence | Succination Site | Modified Peptide PSMs | Xcorr | m/z | charge | MH+ [Da] |
|---|---|---|---|---|---|---|---|---|
| Primary Neurons | | | | | | | | |
| Collapsin Response Mediator Protein 2 | 1 | GLYDGPVC$^{DMF}$EVSVTPK | Cys 504 | 2 | 1.9 | 854.4096 | 2 | 1707.812059 |
| Vimentin | 2 | QVQSLTC$^{DMF}$EVDALK | Cys 228 | 3 | 2.42 | 789.3899 | 2 | 1577.772631 |
| Guanine nucleotide-binding protein G(o) subunit alpha | 3 | M$^{OX}$VC$^{DMF}$DVVSR | Cys 108 | 1 | 2.56 | 534.7373 | 2 | 1068.467333 |
| Annexin A1 | 4 | QAC$^{DMF}$YIEK | Cys 12 | 2 | 1.21 | 499.7269 | 2 | 998.4465808 |
| Primary Astrocytes | | | | | | | | |
| Filamin alpha | 5 | YTPC$^{MMF}$GAGSYTIM$^{OX}$VLFADQATPTSPIR | Cys 841 | 1 | 1.85 | 969.4722 | 3 | 2906.402134 |
| Myosin-9 | 6 | C$^{MMF}$NGVLEGIR | Cys 694 | 10 | 1.21 | 545.7675 | 2 | 1090.524828 |
| Heat shock protein HSP 90-alpha | 7 | VFIM$^{OX}$DNC$^{DMF}$EELIPEYLNFIR | Cys 375 | 3 | 2.24 | 840.0648 | 3 | 2518.180088 |
| Heat shock protein HSP 90-beta | 8 | VFIM$^{OX}$DSC$^{DMF}$DELIPEYLNFIR | Cys 366 | 4 | 1.49 | 1239.089 | 2 | 2477.171678 |
| Collapsin Response Mediator Protein 2 | 9 | GLYDGPVC$^{DMF}$EVSVTPK | Cys 504 | 2 | 3.08 | 847.402 | 2 | 1693.796801 |
| | 10 | GLYDGPVC$^{DMF}$EVSVTPK | Cys 504 | 3 | 1.83 | 854.4108 | 2 | 1707.814501 |
| Vimentin | 11 | QVQSLTC$^{DMF}$EVDALK | Cys 328 | 3 | 2.25 | 789.3909 | 2 | 1577.774706 |
| | 12 | QVQSLTC$^{DMF}$EVDALK | Cys 328 | 3 | 1.65 | 782.3807 | 2 | 1563.754198 |
| Glial fibrillary acidic protein | 13 | QLQALTC$^{MMF}$DLESLR | Cys 292 | 1 | 1.37 | 810.4024 | 2 | 1619.797533 |
| Annexin A1 | 14 | GDRC$^{DMF}$EDM$^{OX}$SVNQPLADTDAR | Cys 190 | 1 | 2.04 | 757.6424 | 3 | 2270.912815 |
| | 15 | QAC$^{DMF}$YIEK | Cys 12 | 1 | 1.06 | 499.7257 | 2 | 998.4441394 |
| Cofilin-1 | 16 | HELQANC$^{MMF}$YEEVKDR | Cys 139 | 1 | 4.86 | 621.9409 | 3 | 1863.808201 |
| Peptidyl-prolyl cis-trans isomerase A | 17 | VC$^{DMF}$FELFADK | Cys 21 | 1 | 1.95 | 608.2839 | 2 | 1215.560594 |
| Fatty acid-binding protein, brain | 18 | TQC$^{DMF}$TFK | Cys 56 | 3 | 2 | 4361.958 | 2 | 871.3869494 |
| N1E Neurons | | | | | | | | |
| ATP-citrate synthase | 19 | YIC$^{MMF}$TTSAIQNR | Cys 20 | 2 | 1.57 | 700.3239 | 2 | 1399.640551 |
| Ubiquitin carboxyl-terminal hydrolase isozyme L1 | 20 | NEAIQAAHDSVAQEGQC$^{MMF}$R | Cys 152 | 6 | 5.87 | 686.3021 | 3 | 2056.891819 |

FIG. 1 (cont'd)

| Protein | SEQ ID | Peptide | Cys site | | | | | |
|---|---|---|---|---|---|---|---|---|
| Isoform Mt-VDAC1 of Voltage-dependent anion-selective channel protein 1 | 21 | NEAIQAAHDSVAQEGQC$^{DMF}$R | Cys 152 | 4 | 4.54 | 690.9748 | 3 | 2070.910007 |
| | 22 | YQVDPDAC$^{MMF}$FSAK | Cys 245 | 11 | 1.67 | 737.3118 | 2 | 1473.610765 |
| T-complex protein 1 subunit beta | 23 | HGINC$^{MMF}$FINR | Cys 289 | 2 | 1.03 | 602.2833 | 2 | 1203.559374 |
| T-complex protein 1 subunit alpha | 24 | LAC$^{MMF}$KEAVR | Cys 125 | 3 | 1.16 | 510.2606 | 2 | 1019.514086 |
| Elongation factor 2 | 25 | STLTDSLVC$^{MMF}$K | Cys 41 | 1 | 1.95 | 5987.895 | 2 | 1196.571825 |
| Heat shock protein HSP 90-beta | 26 | VFIM$^{OX}$DSC$^{MMF}$DELIPEYLNFIR | Cys 366 | 2 | 1.16 | 1232.073 | 2 | 2463.138719 |
| | 27 | VFIM$^{OX}$DSC$^{DMF}$DELIPEYLNFIR | Cys 366 | 3 | 1.98 | 826.3831 | 3 | 2477.164843 |
| Heat shock protein HSP 90-alpha | 28 | VFIM$^{OX}$DNC$^{DMF}$EELIPEYLNFIR | Cys 375 | 5 | 2.77 | 840.0639 | 3 | 2518.177158 |
| Glyceraldehyde-3-phosphate dehydrogenase | 29 | AAIC$^{MMF}$SGK | Cys 22 | 3 | 1.37 | 390.1814 | 2 | 779.3555163 |
| IgE-binding protein | 30 | QQC$^{MMF}$AER | Cys 187 | 1 | 1.4 | 432.678 | 2 | 864.3488635 |
| | 31 | LQGPPYAESPPC$^{MMF}$VVR | Cys 181 | 2 | 2.09 | 871.9227 | 2 | 1742.838182 |
| Transgelin-2 | 32 | NM$^{OX}$AC$^{MMF}$VQR | Cys 124 | 2 | 2.24 | 484.2015 | 2 | 967.3957995 |
| Collapsin Response Mediator Protein 2 | 33 | GLYDGPVC$^{MMF}$EVSVTPK | Cys 504 | 13 | 3.45 | 847.4002 | 2 | 1693.79326 |
| Asparagine synthetase [glutamine-hydrolyzing] | 34 | ETFEDC$^{DMF}$NLLPK | Cys 455 | 3 | 2.36 | 726.838 | 2 | 1452.668383 |
| Tubulin alpha-1A chain | 35 | TIQFVDWC$^{DMF}$PTGFK | Cys 347 | 2 | 2.64 | 843.3975 | 2 | 1685.787767 |
| Tubulin beta-5A chain | 36 | TAVC$^{DMF}$DIPPR | Cys 354 | 1 | | 558.6467 | 2 | 1115.5401 |

FIG. 2

DETECTION OF FUMARATE-DERIVED MODIFICATION IN A TEST SAMPLE

CROSS REFERENCE TO RELATED APPLICATION

This application is a Divisional application of U.S. patent application Ser. No. 16/639,678, entitled "Detection of Fumarate Ester-Derived Modification in a Test Sample," having a § 371(c) date of Feb. 17, 2020, which is the US National Stage Entry of International Patent Application Serial No. PCT/US2018/046861, having a filing date of Aug. 17, 2018, which claims filing benefit of U.S. Provisional Patent Application Ser. No. 62/547,295, having a filing date of Aug. 18, 2017, entitled "Detection of Succination in Lymphocytes," all of which are incorporated herein by reference for all purposes.

BACKGROUND

Multiple sclerosis (MS) is a debilitating disease characterized by the loss of myelin on the nerves of the brain and spinal cord, leading eventually to the death of the axons themselves. It is an autoimmune disease in which the immune cells attack the myelin sheath causing its eventual breakdown around the nerve. As the nerves die, lesions that can be monitored by MRI may appear in the brain and spinal cord.

There is no cure for MS, but several disease-modifying therapies (DMT) exist that can decrease the severity of or delay disease relapses, with most acting through modulation of the immune system. In 2013, the FDA approved dimethyl fumarate (DMF) (Tecfidera®, Biogen Inc.) for the treatment of relapsing remitting multiple sclerosis (RRMS), and a formulation of DMF (Skilarence®, Almirall) was approved in 2017 in Europe for the treatment of psoriasis. Phase III trials have demonstrated that DMF can significantly reduce the rate of relapse, and MRI imaging of patients also suggests that it is neuroprotective, potentially increasing myelin density. While many MS therapies can slow disease progression, the fact that DMF may promote re-myelination is particularly exciting. Alternatives to DMF are also being developed, such as, but not limited to, BIIB098 (formerly ALKS 8700), a monomethyl fumarate (MMF) prodrug that is currently in Phase III clinical trials for RRMS.

DMF is structurally related to the citric acid cycle metabolite fumarate. Fumarates have been shown to react directly with cysteine residues in proteins (known as protein succination) and to permanently modify them to affect a protein's structure or function. Specifically, the chemical modification of proteins by fumarate yields S-(2-succino) cysteine (2SC), which has been shown to increase in adipocytes under diabetic conditions, as well as in fumarase-deficient tumors where fumarate levels are endogenously elevated. Kelch-like ECH-associated protein 1 (KEAP1) has been shown to be a direct target of DMF action (Linker 2011) through similar modification of cysteine residues. This DMF modification of KEAP1 stabilizes a transcription factor—Nuclear factor (erythroid-derived 2)-like 2 (Nrf2)—that, in turn, activates an antioxidant response that increases the cellular capacity to respond to oxidative stress, which is a mediator of the beneficial response in MS patients.

Despite the documented benefits and the fact that Tecfidera® is reported to be the No. 1 prescribed pill for RRMS in the US, the drug still has a number of mild side effects (gastrointestinal discomfort, flushing), as well as a serious risk of lymphopenia (low lymphocyte counts). This reduction in white blood cells is associated with an increased risk of susceptibility to John Cunningham virus (JC virus) and to the development of the deadly brain infection progressive multifocal leukoencephalopathy (PML). Several deaths related to PML in patients being treated with DMF for RRMS have been reported to date. As a result, both the US Food and Drug Administration (FDA), as well as the European Medicines Agency (EMA), have issued updated safety recommendations to minimize PML risk. In addition, the EMA recommends complete blood counts every 3 months to identify patients at risk. Presently, there is no suggested DMF cutoff other than careful monitoring in patients with lymphocyte blood counts lower than $0.5 \times 10^9$/L.

As increasing numbers of patients are treated with DMF for the modulation of RRMS or psoriasis, new reports indicate that current guidelines are insufficient to accurately monitor the risk for PML. There is currently no precise cut-off in white blood cell count that can inform clinicians when a patient should discontinue treatment with DMF or DMF alternatives such as MMF prodrugs. New tests that look at very specific populations of lymphocytes may be one option, but this is not standard clinical practice. Currently, there is no accurate way to assess a patient response to such therapy in order to know when therapy should be stopped.

What are needed in the art are independent measures that assess the level of protein modification (e.g., succination) on a subject due to disease or disease treatment. For instance, a method that can assess the impact of DMF on a patient's immune cells/blood profile through determination of presence or level of protein modification due to the treatment could help the clinician determine when removal from DMF should be considered, if even for a short while. Any measurement that could allow more accurate monitoring would be of great benefit to patients wishing to utilize such a neuroprotective drug (versus other therapies that only slow progression by working on the immunomodulatory aspects of disease therapy).

SUMMARY

Disclosed are methods for determining the protein modification level in a test sample, and in one embodiment, methods for determining the fumarate ester-derived succination level in a test sample. One method can include hydrolyzing proteins of a test sample. The test sample can be one that includes succination protein targets of interest. For instance, the sample can include white blood cells, red blood cells, platelets, total serum, urinary proteins, or a combination of sources of protein targets. A method can also include determining a quantity of modified cysteine (DMF-cysteine, MMF-cysteine, and/or 2SC) in the sample. A method can then include comparing this determined quantity to a control quantity of modified cysteine and, depending upon the comparison, determining that the subject should modify or alter a treatment program, e.g., discontinue treatment with DMF.

According to another embodiment, rather than hydrolyzing components of a sample, a method can include isolating peripheral blood mononuclear cells (PBMC) of a sample and enzymatically digesting the proteins of the PBMC. Following this, the digested product can be examined to determine the presence or quantity of modified peptides in the sample, the modified peptides including modified cysteine in the peptide sequence. In those embodiments in which the quantity of modified peptides is determined, a method can also include comparing this determined quantity to a control quantity of modified peptides, and depending upon this comparison, determining that a subject should alter a treatment program, e.g., discontinue treatment with DMF.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

In general, disclosed herein are methods for determining the protein modification level of a test sample. More specifically, disclosed methods are directed for examination of a test sample that includes proteins of interest so as to determine the presence or quantity of fumarate ester-derived modification of proteins of the subject. The proteins can include, for example, PBMC proteins (e.g., proteins of mononuclear blood cells, lymphocytes, macrophages, monocytes, etc.) or serum proteins. The methods can be beneficially utilized, in one embodiment, for determination of excessive fumarate ester-derived modification (e.g., succination) of PBMC proteins, which can be utilized in prevention or early detection of lymphopenia. In those embodiments in which a subject is under treatment with DMF, for instance, in treatment of MS or other autoimmune disorders (e.g., psoriasis), the method can be utilized as a determination that treatment of the subject with DMF should be slowed or stopped.

Figure 2:
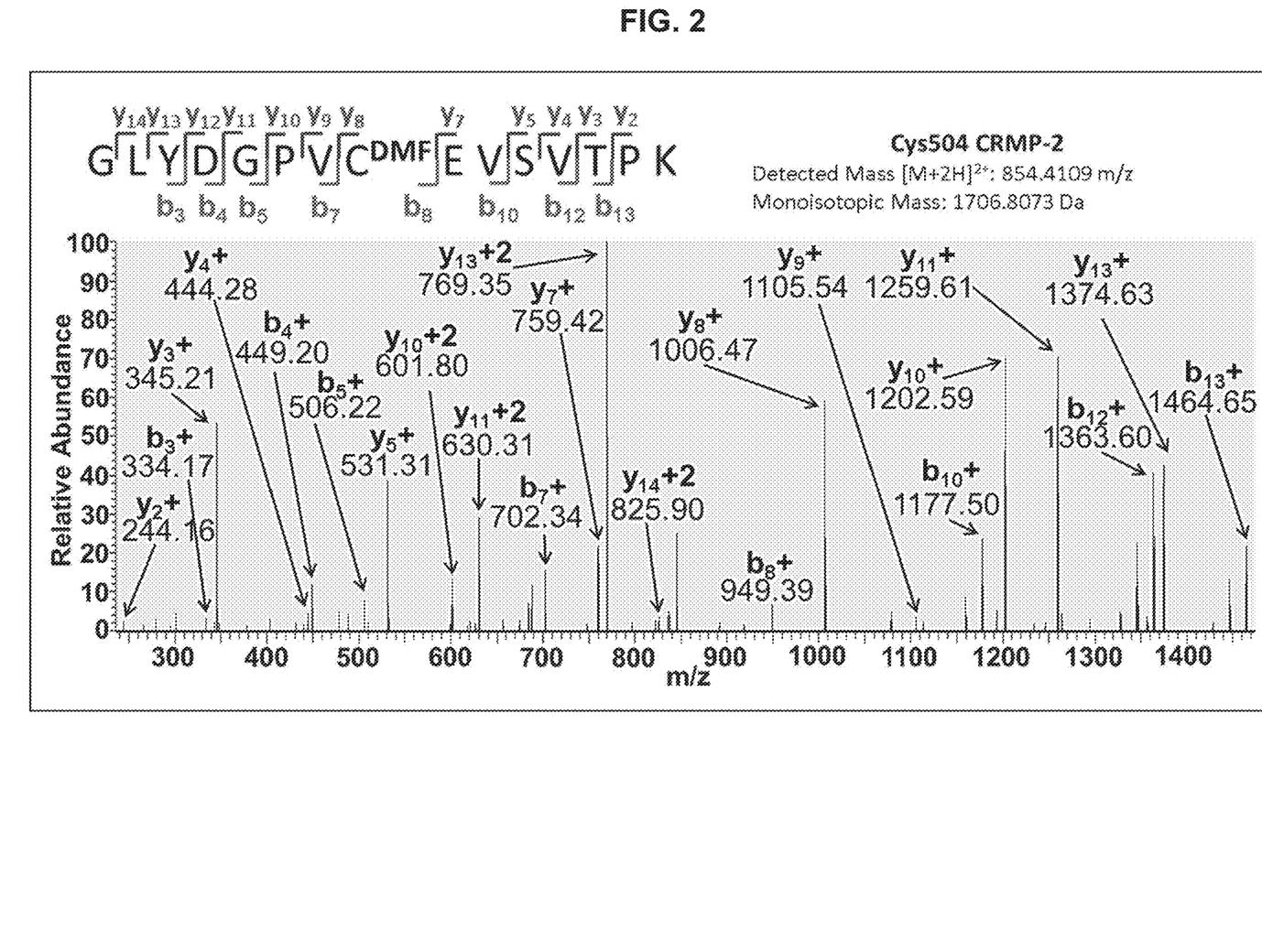
FIG. 2 illustrates mass spectrometry data of the modified peptide SEQ ID NO: 1 derived from Collapsin Response Mediator Protein 2 (CRMP2).

The mode of action of DMF in treatment of MS is understood to be through the KEAP1/Nrf2 pathway. The disclosed method has been developed through realization that KEAP1 is not the only physiological target of DMF, and other targets including the nervous system, lymph system and/or plasma/serum/urinary/tissue proteins may be affected by the drug. For example, a specific cysteine residue on CRMP2 can be modified by DMF (specific mass spectrometry evidence of this is illustrated in FIG. 2). This cysteine is adjacent to several other serine/threonine residues that become phosphorylated as an axon retracts (degenerates) in the progress of MS.

Without wishing to be bound to any particular theory, it is believed that the modification of this cysteine residue may prevent the phosphorylation of the adjacent residues and, thereby, may prevent the signal for axon degeneration, acting in a neuroprotective manner. An article (Morinaka et al. Sci Signaling 2011, 26:4(170):ra26) demonstrating that this cysteine needs to be oxidized prior to the phosphorylation signal supports this understanding (as succination by DMF would prevent oxidation).

In addition to being present in brain cells, CRMP2 is also present in lymphocytes and plays a role in their migration, e.g., in response to viral infections (see, e.g., Varrin-Doyer, et al. J Immunol. 2012 188:1222-33). Thus, the CRMP2 protein is involved in both neural motility and lymphocyte motility—2 key cell types that are altered in MS disease progression. DMF modification of lymphocyte CRMP2 by succination may alter cell migration properties in response to, e.g., JC virus, and may enable the infection to develop in susceptible individuals.

Other proteins have also been found capable of being succinated or otherwise modified by fumarate esters. For instance, FIG. 1 describes multiple different brain cell proteins and particular peptides modified by DMF/MMF, at least some of which also present in lymphocytes, blood cells, or other tissues, the modification of which could affect the immune response of an individual. Additional DMF-modified proteins have been described by others (see, e.g., Blewett, et al., Science Signaling, Vol. 9, Iss. 445, September 2016), at least some of which are present in lymphocytes, blood cells, or other tissues, the modification of which could affect the immune response of an individual. For instance, Kornberg et al. (Science. 2018 360:449-453) have demonstrated the specific succination of the protein GAPDH in isolated PBMCs from patients treated with DMF for 3 months, a protein that is also identified in DMF treated neurons in FIG. 1. Thus, in one embodiment, modification of specific proteins can be detected in isolated patient cells.

Disclosed methods can be beneficially utilized to determine the presence or quantity of succination of blood cell proteins and/or lymphocyte proteins and can be useful in determining potential immune system problems related to protein modification due to interaction with DMF and/or MMF. In particular, methods can be useful for monitoring DMF activity and potential lymphopenia or PML in individuals receiving a drug or prodrug. The disclosed methods can provide a more accurate measure of immune cell or protein susceptibility to excessive fumarate ester modification, as well as individual susceptibility to developing unwanted DMF side effects.

Protein modification can be measured in isolated lymphocytes or other white blood cells (e.g., peripheral blood mononuclear proteins), plasma proteins other than white blood cells, cerebrospinal fluid, urine, or other tissue samples (skin, biopsy material, tumor sample) derived from an individual. A quantified modification level beyond a control value in a subject under treatment with DMF or a prodrug therefore can indicate that the therapy should be slowed or temporarily halted to allow the immune cells time to recover, or alternatively, to be permanently halted in some embodiments.

While disclosed methods may be of use with subjects under treatment with DMF or a prodrug, it should be understood that the methods are not limited to this application, and the examination of a sample for the presence or quantity of succinated proteins may be of use in other applications, for instance, in cancer patients with suspicious kidney tumors. Such applications could be utilized to determine a 2SC level due to causes other than DMF treatment. For instance, this approach could be useful in diagnosis and/or treatment of disease that demonstrates an endogenous increase in fumarate due to, e.g., tumor growth or metabolism change. By way of example, mitochondrial diseases appear to lead to increased succination in tissues, e.g., brain tissue as discussed by Piroli, et al. (Molecular & Cellular Proteomics, 2016, 15:445-61) for subjects suffering from Leigh Syndrome, and disclosed methods could be useful in diagnosis and/or treatment of such disease states.

The determination or quantification of succination of proteins in urine, blood, or other sample sources, e.g., lymphocyte protein succination, can be performed, in one embodiment, by use of isotope dilution mass spectrometry, e.g., using gas chromatograph mass spectrometry (GC-MS) or liquid chromatograph mass spectrometer (LC-MS). For instance, in one embodiment, the absolute quantification of succination (measured by GC-MS) according to methods as described previously (e.g., Alderson 2006, Nagai 2007, Piroli 2016) can be used to accurately measure the overall level of succination in tissue proteins, plasma proteins, and urine, among other sample sources.

In one embodiment, a sample as directly obtained can be examined for presence or quantity of succination. Alternatively, a sample as obtained can be pretreated, for instance, to isolate one or more components of the sample as obtained for examination of succination level. By way of example, a sample can be pretreated to isolate white blood cells of the sample, and this isolated portion of the sample can be examined for presence or quantity of succination.

In one embodiment, a total serum/plasma sample can be treated in order to precipitate the total protein, for example, using an agent that precipitates the protein. The precipitated proteins can then be collected, e.g., by centrifugation, for further analysis of all collected protein of a sample, including PBMC protein. This approach may be beneficial as this can allow for a desired delay from the time of sample collection to succination examination. For instance, serum samples could be frozen with protein extraction and examination for succination carried out at a later time.

According to one embodiment, total succination quantification of a sample (or one or more components thereof), irrespective of particular proteins affected by the modification, can be carried out via hydrolysis of the proteins and determination of presence/quantity of modified cysteines in the sample. By way of example, whole cell sample (e.g., white blood cells isolated from a sample) or whole protein sample (e.g., total protein separated from a serum or urine sample) can be subjected to lysis. Following, protein from the whole cell or whole protein lysate can be used for analysis of 2SC. For instance, the protein can be precipitated (e.g., with an equal volume of 20% trichloroacetic acid) to form a protein pellet, optionally with removal of other sample components such as lipids. The dried pellet can then be hydrolyzed, for instance, by hydrochloric acid (e.g., 6M HCl at 110° C. for 24 hours) and dried (in vacuo). The hydrolyzed samples can be further separated (e.g., on C18 columns) to remove particulate matter and elute polar amino acids. N,O trifluoroacetyl methyl ester derivatives can be prepared and analyzed for succination by multiple reaction monitoring (MRM) GC-MS/MS. The parent and daughter ion pairs monitored can include lysine m/z 180>69, d8-lysine, m/z 188>69; 2SC, m/z 284>242, U-13C3,15N-2SC m/z 288>246, or any other specific ions produced by fragmentation of the above products.

In one embodiment, liquid chromatography-mass spectrometry methods (LC-MS) may be used to quantify total levels of 2SC. This approach does not require the preparation of the methyl ester derivatives. Instead, free 2SC levels can be detected by methods including, but not limited to, negative ion mode mass spectrometry, e.g., similar to methods used by Drusian et al. Cell Reports, 24:1093-1104.e6.

Quantification of modified cysteine in a sample including proteins can be performed, in one embodiment, by isotope dilution mass spectrometry based on standard curves constructed from mixtures of known amounts of heavy labeled and natural abundance standard. The amounts of all analytes can be normalized to the lysine content of the samples when detected simultaneously. They can also be normalized to the total protein content or the DNA content of the samples.

In one embodiment, a quantified sample can be compared to a control sample so as to determine undesirable cysteine modification levels of the test sample. For example, an acceptable modified cysteine range of a control can be developed from data obtained from a control group comprising individuals that are not under DMF treatment, individuals under DMF treatment with normal blood counts, individuals not suffering from the disease at issue (e.g., mitochondrial disease), or some other suitable standard. A finding that the modified cysteine level of a subjects falls outside of the control range by about 20% or more, or about 10% or more, in some embodiments, optionally examined in combination with a total lymphocyte count or a normalized value thereof, can lead to a determination that the individual has an undesirably high level of protein succination, and, in one embodiment, that DMF treatment should be modified.

For instance, Table 1, below, presents protein succination levels of human blood leukocytes as determined via GC-MS analysis from samples obtained from individuals not under treatment with DMF or any prodrug. These values demonstrate detectable and quantifiable free 2SC in hydrolyzed human white blood cell samples as may be utilized in determining a control level in a quantified testing protocol.

TABLE 1

| Sample No. | 2SC (mmol/mol Lys) |
|---|---|
| 1 | 0.341 |
| 2 | 1.207 |
| 3 | 0.422 |
| 4 | 0.596 |
| 5 | 0.393 |
| 6 | 0.299 |
| 7 | 0.139 |
| 8 | 0.258 |
| 9 | 0.123 |
| 10 | 0.194 |
| 11 | 0.243 |
| 12 | 0.123 |
| 13 | 0.583 |
| 14 | 0.279 |
| 15 | 0.223 |
| 16 | 0.235 |
| 17 | 1.137 |

When conducting a comparison of the modified cysteine level from an individual against those values taken from a control group, the number of individuals utilized in development of the control value may vary, as is generally known in the art. However, in order to be of increased value, a statistically significant number of individuals are generally utilized. Multiple individuals can be utilized in a control group. For example, a control group can include about 10, about 25, about 40, or about 100 individuals or more in order to create a suitable range of control values.

According to one embodiment, a test sample can be examined for the presence or quantity of particular peptides known to be modified in the presence of DMF and/or MMF.

Figure 1:
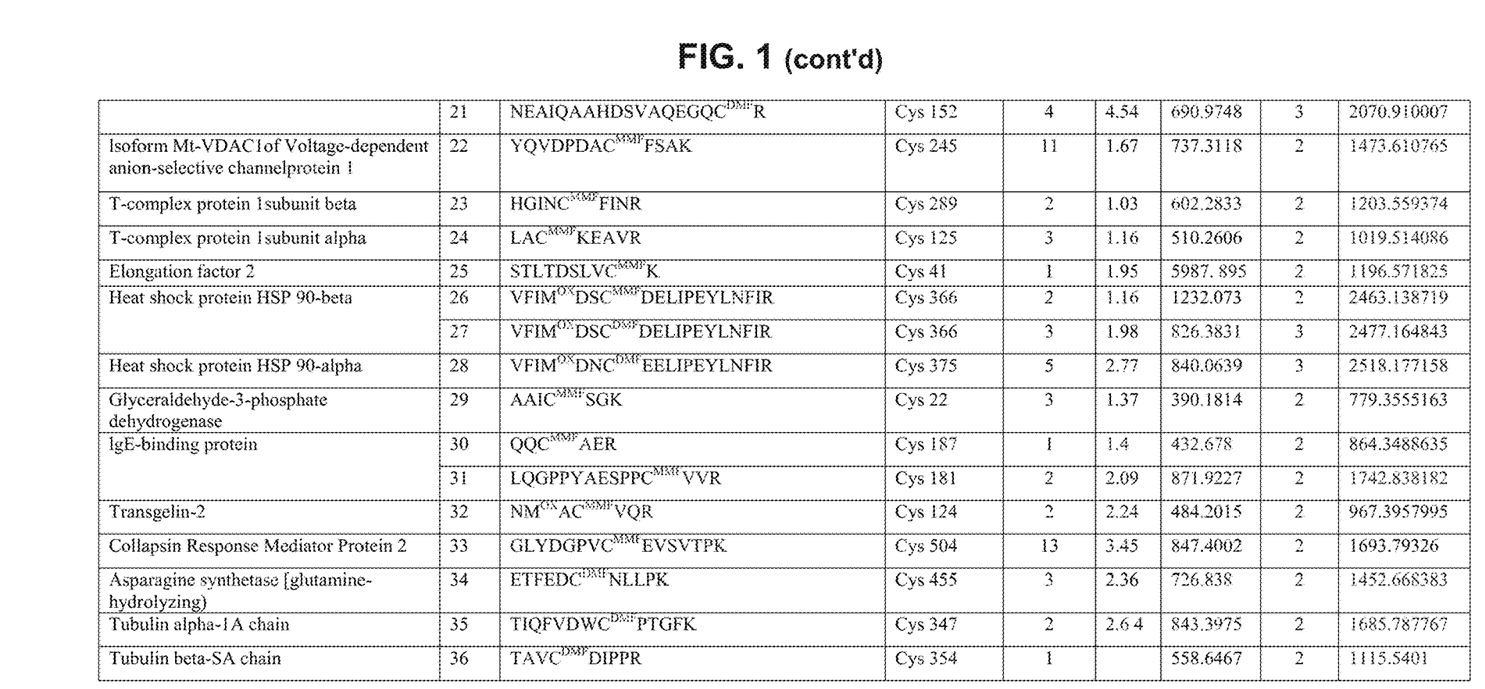
FIG. 1 is a table presenting peptide sequences (SEQ ID NO: 1-36) derived from proteins modified upon interaction of neural cells with DMF or its metabolite monomethyl fumarate (MMF).

FIG. 1 presents multiple protein targets found in brain cells that DMF binds to and modifies. The determination of the presence or quantity of one or more of SEQ ID NOs: 1-36, as presented on FIG. 1, can thus be utilized to determine a need to modify DMF treatment.

According to this embodiment (examples of which are described in more detail in the Examples section, below), a protein sample can be digested into peptides enzymatically and the digested product can be examined to determine the presence or quantity of one or more of SEQ ID NOs: 1-36 as peptides of a known size/sequence.

Based on the known modified proteins of FIG. 1 (or optionally other recognized DMF-modified proteins), a mass spectrometer-based detection regime can be carried out to monitor a sample for the presence or quantity of a particular peptide based upon the mass of the peptide, for instance, as provided in the last column of FIG. 1. This approach provides a route to uniquely detect DMF, MMF, and/or 2SC modified proteins in a sample.

The present disclosure may be better understood with reference to the Examples set forth below.

EXAMPLE

Unless otherwise noted, all chemicals were purchased from Sigma-Aldrich™ Chemical Co. (St. Louis, MO). Criterion polyacrylamide gels, nitrocellulose membranes and Precision Plus Protein™ ladder were purchased from Bio-Rad™ Laboratories (Richmond, CA). Polyvinylidene difluoride (PVDF) membranes and Pierce™ ECL Plus chemiluminescent substrate were from GE® Healthcare (Piscataway, NJ). The preparation of the polyclonal anti-2SC antibody has been described previously (Nagai 2007). The following commercial antibodies were used: α-tubulin DM1A, VDAC2 9412 from Cell Signalling Technology, Inc. (Danvers, MA); β-tubulin TUB2.1 from Santa Cruz Biotechnology (Dallas, TX); HNE (HNE-11-S) from Alpha Diagnostics International, Inc. (San Antonio, TX); Ndufs4 2C7CD4AG3 and DJ1 ab4150 from Abcam (Cambridge, MA); VDAC1 clone N152B/23 from Antibodies Inc. (Davis, CA).

Primary Neuron Isolation and Culture

Primary neurons from newborn rat brain cortices were isolated and cultured using an adaptation of methods described previously. Briefly, postnatal day 1 rats were sacrificed by decapitation, the brains were aseptically dissected, and cortices were separated from the rest of the brain in ice-cold Hibernate®-A medium (Life Technologies) containing 2% (v/v) B-27 supplement (Life Technologies) and 0.5 mM glutamine (Invitrogen™). The tissue was minced in fragments of about 1 mm$^3$ with a scalpel and subjected to digestion with 2 mg/ml papain (Worthington) in the supplemented Hibernate®-A medium for 20 minutes at 30° C. in a shaker incubator set at 100 rpm. After thorough trituration through a fire-polished Pasteur pipette, the tissue was allowed to settle for 5 minutes and the supernatant was carefully layered on top of a discontinuous OptiPrep™ (Sigma-Aldrich™) gradient prepared in Hibernate®-A medium; the layers contained 35, 25, 20 and 15% OptiPrep™. The gradient was centrifuged at 800 g for 15 minutes at room temperature, and layers 1 (15% OptiPrep™) and 2 (20%) were discarded. Layer 3 (25%) was collected and added a five-fold volume of Neurobasal™—A medium (Life Technologies), containing 0.5 mM glutamine and 2% B-27 supplement. After a centrifugation at 500 g for 5 min at room temperature, cells were resuspended in Neurobasa™-A medium containing 0.5 mM glutamine, 2% B-27 supplement, and 5 ng/ml bFGF (Invitrogen™); counted and plated on 24-well plates pretreated with 0.01% poly-L-lysine (Sigma-Aldrich™) at a density of 200,000 cells/well. Fifty percent of the media was replaced every third day, with the addition of 5 μM AraC from DIV 3 to inhibit glial proliferation. On DIV 8, cells were left untreated or treated for 24 h with 10 μM or 100 μM dimethyl fumarate (DMF) prepared in Dulbecco's PBS (DPBS) and filtered. On DIV 9, medium was removed, cells were rinsed 3 times with 1 ml DPBS and scraped from the wells after the addition of 250 μl radioimmunoprecipitation assay (RIPA) lysis buffer (50 mM Tris-HCl, 150 mM NaCl, 1 mM EDTA, 0.1% Triton™ X-100, 0.1% SDS, 0.5% sodium deoxycholate, pH 7.4), with the addition of 2 mM diethylenetriaminepentaacetic acid and a protease inhibitor cocktail (P8340, Sigma-Aldrich™, St Louis, MO). Homogenization was performed by pulse sonication at 2 watts using a Model 100 sonic dismembrator (Fisher Scientific™, Fair Lawn, NJ) for 30 seconds prior to resting on ice for 30 minutes in lysis buffer. Protein in the lysates was precipitated with 9 volumes of cold acetone for 10 minutes on ice. After centrifugation at 3,000 g for 10 minutes and removal of the acetone, the protein pellet was re-suspended in 150 μl RIPA buffer. The protein content in the different samples was determined by the Lowry assay.

Primary Astrocyte Isolation and Culture

Primary astrocytes were isolated and cultured from neonatal P1-P2 Sprague-Dawley rats. Animals were decapitated following which cortices, brainstem, and hippocampi were aseptically dissected in petri dishes filled with ice-cold Hanks' Balanced Salt Solution (Corning® HBSS; Sigma, St. Louis, MO), HEPES (10 mM; Sigma), and gentamicin sulfate (5 μg/mL; Life Technologies, Carlsbad, CA). The dissected tissue was cut into pieces and dissociated by trypsin treatment (10 μl/mL; Life Technologies, Carlsbad, CA), followed by trituration with sterile glass pipettes. Cells were plated in 24-well plates pre-coated with poly-l-lysine (50 μg/mL; Sigma). Cultures were maintained in DMEM/F12 (Life Technologies) medium supplemented with 10% fetal bovine serum (FBS) and stored in an incubator at 37° C. (5% $O_2$/95% $CO_2$). At day in vitro 1 (DIV1), cells received a full medium replacement with subsequent half-medium replacements every third day. This protocol results in astrocyte-enriched cultures as confirmed by immunostaining against the astrocytic marker, glial fibrillary acidic protein (GFAP). Cells were harvested at DIV10-12. All animal use was consistent with the guidelines issued by the National Institutes of Health and were approved by the University of South Carolina Institutional Animal Care and Use Committee.

N1E-115 Cell Culture

N1E-115 cells (subclone N1E-115-1 neuroblastoma cells) were obtained from Sigma (08062511, St. Louis, MO). The cells were grown and expanded in non-differentiation medium (NDM): 90% DMEM (Gibco™, Grand Island, NY) with 25 mM glucose, no pyruvate, 25 mM HEPES, 4 mM glutamine and 10% fetal bovine serum (FBS, Atlanta Biologicals, Atlanta, GA). At 80% confluence, the cells were differentiated into neurons in the presence of 2% FBS and 1.25% dimethyl sulfoxide in DMEM for 5 days. In addition to the assessment of the neuronal phenotype by light microscopy, the detection of synaptophysin protein levels was used to confirm successful differentiation. During the final 6 or 24 hours of differentiation, the cells were treated with 10-100 μM DMF and harvested as described above for primary neurons, with the addition of phosphatase inhibitors to the DPBS washes and the RIPA buffer used for scraping to prevent dephosphorylation of CRMP-2. For some experiments, cells were treated with recombinant 1-3 nM mouse Semaphorin 3A Fc chimera protein (R&D Systems, Inc., Minneapolis, MN) for 10-30 minutes, or with 100 μM hydrogen peroxide for 10-15 minutes before harvesting the cells. Homogenization, acetone-precipitation, re-suspension, and protein determination in the samples was performed as described for primary neurons.

Lentiviral Transduction of 3T3-L1 Fibroblasts

TRC2 Fh1 shRNA, clone—TRCN0000246831 or SHC202 MISSION TRC2 pLKO. 5-puro non-mammalian shRNA control plasmids (Sigma-Aldrich™, St. Louis, MO) were used to generate the lentiviral vectors. The vectors also contained a puromycin resistance gene. 15 μg vector plasmid, 10 μg psPAX2 packaging plasmid (Addgene 12260, Cambridge, MA), 5 μg pMD2.G envelope plasmid (Addgene 12259, Cambridge, MA) and 2.5 μg pRSV-Rev plasmid (Addgene 12253, Cambridge, MA) were transfected into 293T cells. The filtered conditioned medium was collected and stored at −80° C. until use.

3T3-L1 fibroblasts (ATCC) were incubated overnight with 150 μL of filtered conditioned medium containing Fh1 shRNA or control lentivirus. Successfully transduced fibroblasts were selected using 1 μg/mL puromycin. The selected fibroblasts were propagated in the presence of puromycin until confluent and harvested in RIPA buffer as described above. Successful knockdown of fumarase expression was determined by immunoblotting and fumarate levels were determined by GC-MS as described previously (Piroli 2016).

Saponification of Fumarate Esters

60 μg of protein from control and DMF treated cell lysates was incubated with 80% dimethyl sulfoxide (DMSO), 6 mM potassium hydroxide (KOH), and 1 mM EDTA at room temperature for 30 minutes, with vortexing at 5-minute intervals. The pH was adjusted to 7, and the protein was precipitated with 90% acetone before being re-suspended in 40 μL RIPA buffer. The pH was again adjusted to 7 prior to gel electrophoresis and immunoblotting.

One-Dimensional PAGE and Western Blotting

Western blotting to detect protein succination (2SC), fumarase, CRMP2 (phosphorylated forms and total levels), Haem oxygenase-1 (HO-1, Enzo Life Sciences), mitochondrial markers Ndufb8 (complex I, MitoSciences®, Eugene, OR), 30 kDa subunit (complex II, MitoSciences®), succinate dehydrogenase a (complex II and Krebs cycle, Cell Signaling Technology®, Danvers, MA), core 2 subunit (complex III, MitoSciences®), alpha subunit (complex V, MitoSciences®) and fumarase (Krebs cycle, Cell Signaling Technology®), and alpha and beta tubulin (Santa Cruz Biotechnology, Inc., Dallas, TX) was performed as described previously, after separation of the proteins by SDS-PAGE (J Invest Dermatol. 2007 April; 127(4):835-45). For protein identification purposes, gels were stained with Coomassie Brilliant Blue following electrophoresis to allow band isolation and mass spectrometry (see below). In some cases, membranes were stripped with 62.5 mM Tris, pH 6.8, containing 2% SDS and 0.7% 2-mercapto ethanol for 20 minutes at 65° C. prior to re-probing with a different antibody.

Protein Identification from SDS-PAGE Gel Bands by LC-MS/MS

For the identification of succination sites, 60 μg of protein from primary neurons, 200 μg of protein from primary astrocytes or 120 μg of protein from differentiated N1E-115 neurons were resolved by SDS-PAGE, and the gels were stained with Coomassie Brilliant Blue. After de-staining, all protein bands were excised from the gels and subjected to in-gel digestion with trypsin. Briefly, proteins were reduced with 10 mM dithiothreitol and alkylated with 170 mM 4-vinylpyridine. Trypsin digestion was carried out overnight at 37° C. in the presence of 1.5 ng sequence grade modified trypsin (Promega®, Madison, WI) in 50 mM ammonium bicarbonate. After gel extraction, the peptides were re-suspended in 1% acetic acid and analyzed on a Dionex™ UltiMate™ 3000-LC system (Thermo Scientific™, Rockford, IL) coupled to an Orbitrap Velos Pro™ mass spectrometer (Thermo Scientific™, Rockford, IL). The LC solvents were 2% acetonitrile/0.1% formic acid (Solvent A) and 80% acetonitrile/0.1% formic acid (Solvent B). At 4 minutes, the trap column, a 2 cm Acclaim™ PepMap™ 100 column (Thermo Scientific™) was put in line with the analytical column, a 75 μm C18 stationary-phase LC Pico-Chip® nanospray column (New Objective, Inc., Woburn, MA). The peptides were eluted with a gradient from 98% A:2% B to 40% A:60% B over 30 minutes, followed by a 5-minute ramp to 10% A:90% B that was held for 10 minutes. The Orbitrap was operated in data-dependent MS/MS analysis mode and excluded all ions below 200 counts. Following a survey scan, 8 precursor ions were selected for further MS/MS. The data-dependent acquisition (DDA) data were analyzed using Proteome Discoverer™ 1.4 software with SEQUEST search engine against the uniprot_ref_mouse database (2014-10-03 version, 52,474 proteins) or uniprot_ref_rat database (2011-5-11 version, 39765 proteins) with $X_{corr}$>1 validation (+2) and an allowance for 2 missed cleavages. For all identifications, the spectra were manually inspected to confirm identity and incorrect identifications were discarded. To further confirm the succinated proteins that were identified in DDA mode, multiple reaction monitoring (MRM) was used to monitor select succinated peptide masses of interest for CID (collision-induced dissociation)-MS/MS analysis at a resolution of 7500. The CID-MS/MS data was sequenced manually using Thermo Scientific™ Xcalibur™ 2.2 software to confirm the modified peptides. No fixed modifications were considered. The variable modifications of methionine oxidation ($M^{OX}$), proline hydroxylation ($P^{OX}$) cysteine pyridylethylation ($C^{PE}$, 105.058) or cysteine succination ($C^{2SC}$) by fumarate (116.011), cysteine succination by monomethyl fumarate ($C^{MMF}$ 130.026) or cysteine succination by dimethyl fumarate ($C^{DMF}$, 144.042) were considered with a mass tolerance of 15 ppm for precursor ions and a mass tolerance of 10 ppm for fragment ions. The mass spectrometry proteomics data have been deposited to the ProteomeXchange Consortium via the PRIDE Proteomics Identification Database.

Experimental Design and Statistical Analysis

Analyses were performed with a minimum of 3 independent biological replicates per group (n=3-8). Data are summarized throughout as mean±standard error and are plotted using SigmaPlot® 11 software (Systat Software™, Inc. San Jose, CA) and Prism® 4 (GraphPad® Software, La Jolla, CA). Statistical analyses were performed using SigmaPlot® 11 and Prism® 4. When two groups were compared, the Student "t" test was used. Differences between more than 2 groups were analyzed using one-way ANOVA™ with the Student-Newman-Keuls post-test. In all cases, P<0.05 was considered statistically significant.

Results

In order to detect succinated proteins in neurons treated with DMF for 24 hours, a previously developed procedure was employed (Manuel, 2013) using alkaline hydrolysis to remove the ester and permit immunological detection of succination. In the absence of ester hydrolysis, there was limited detection of succinated proteins in rat primary neurons using the anti-2SC antibody, with only one band ~50 kDa showing a significant increase in intensity following 100 µM DMF treatment. This indicated that at least one or both of the methyl groups had not been removed by intracellular esterases and was preventing interaction with the anti-2SC antibody that recognizes the S-(2-succino)cysteine epitope. To ensure that the succinated proteins detected were solely of neuronal origin, N1E-115 neuroblastoma cells were differentiated to a neuronal phenotype (confirmed by increased synaptophysin content) and treated with DMF for 24 hours. The hydrolysis of the ester in the presence of KOH facilitated the detection of a large number of succinated proteins. Fibroblasts that had fumarase knocked down using a lentiviral mediated shRNA approach to increase endogenous fumarate levels were used as a positive control for succination. The intensity of succinated proteins in the DMF-treated neurons versus the positive control indicated that fumarate esters readily enter cells and react with a wide range of protein thiols. Both DMF and MMF are significantly more reactive than fumarate itself and are capable of modifying intracellular proteins before they are de-methylated. Since DMF is known to modify thiols in Keap1, leading to the induction of antioxidant response proteins such as heme oxygenase 1 (HO-1), it was confirmed that DMF treatment significantly induced HO-1 expression.

In order to identify the succinated proteins in DMF-treated neurons, LC-MS/MS was used and results were searched for the succination of protein thiols by either DMF ($C^{DMF}$), or the demethylated metabolites MMF ($C^{MMF}$) and fumarate ($C^{2SC}$) This proteomic approach allows for confirmation of the exact sites of succination, which does not require the base hydrolysis of the ester that can also result in a partial loss of protein. As noted in FIG. 1, all of the proteins identified were succinated by DMF or MMF rather than 2SC, suggesting that both of these fumarate esters reacted with intracellular proteins more rapidly than they could be converted to fumarate. In primary rat neurons, the identity of 4 succinated proteins was confirmed, and in N1E-115 neurons, a total of 15 protein subunits modified by either DMF or MMF was confirmed. Since the N1E-115 cultures were devoid of any glial cells that may be present in primary neuronal cultures, the identified proteins reflect true neuronal targets of fumarate ester modification. Since fumarate esters were previously shown to induce Nrf2 in glial cells in vivo (Linker 2011), additional protein targets of DMF-mediated succination in primary astrocyte cultures were also investigated. FIG. 1 presents the results, confirming the detection of 11 succinated protein subunits in primary rat astrocytes after 24 hours treatment with up to 100 µM DMF. Overall, this targeted approach identified 24 distinct protein subunits in both neurons and astrocytes that were directly modified by either DMF or MMF.

The chemical modification of several cytoskeletal proteins was observed in all cell types examined (FIG. 1). In astrocytes, this included abundant cytoskeletal proteins such as Glial Fibrillary Acid Protein (GFAP) and vimentin, as well as cofilin-1, a dynamic regulator of actin polymerization.

Strikingly, all three cell preparations confirmed succination of the Collapsin Response Mediator 2 (CRMP2) peptide GLYDGPVCEVSVTPK (SEQ ID NO: 1) by either MMF or DMF (FIG. 1). The $y_8$ and $b_8$ fragment ion designations in the annotated spectrum shown in FIG. 2 confirm the designation of Cys504 as the site of succination by DMF in primary rat neurons (+2 charge-state, 854.4109 m/z). The presence of pyridylethylated Cys504, representative of non-succinated cysteine, was also detected in the primary rat neurons (+2 charge-state, 834.9182 m/z).

While certain embodiments of the disclosed subject matter have been described using specific terms, such description is for illustrative purposes only, and it is to be understood that changes and variations may be made without departing from the spirit or scope of the subject matter.

What is claimed is:

1. A method for determining a succination level in a test sample, comprising:
    isolating one or more components from the test sample of a subject, wherein the isolated one or more components comprise peripheral blood mononuclear cells;
    hydrolyzing proteins of the test sample;
    examining the hydrolysis product according to a negative ion mode mass spectrometry analysis technique; and
    by use of the examination, determining the presence or quantity of free s-(2-succino) cysteine (2SC) in the test sample,
    wherein the subject has been treated with dimethyl fumarate or a monomethyl fumarate prodrug prior to determining the presence or quantity of free 2SC in the test sample.

2. The method of claim 1, the step of examining further comprising comparing the negative ion mode mass spectrometry analysis results to those of a control sample and thereby determining the quantity of free 2SC in the test sample.

3. The method of claim 1, wherein the one or more components comprise the proteins that are hydrolyzed.

4. The method of claim 1, the peripheral blood mononuclear cells comprising lymphocytes, macrophages, monocytes, or a combination thereof.

5. The method of claim 1, wherein the isolating comprises precipitating the total protein of the test sample and collecting the precipitated proteins, wherein the isolated one or more components comprise the collected precipitated proteins.

6. The method of claim 1, wherein the proteins to be hydrolyzed have not been separated from the test sample prior to the step of hydrolyzing.

7. The method of claim 1, wherein the test sample has been obtained from a subject that has been diagnosed with an autoimmune disorder.

8. The method of claim 7, wherein the autoimmune disorder is multiple sclerosis.

9. The method of claim 7, further comprising determining wherein the subject should discontinue treatment with dimethyl fumarate or a monomethyl fumarate prodrug based on the presence or quantity of free 2SC in the test sample.

10. The method of claim 1, wherein the test sample has been obtained from a subject diagnosed with a cancer.

11. The method of claim 1, wherein the test sample has been obtained from a subject diagnosed with a mitochondrial disease.

12. The method of claim 1, wherein the test sample comprises blood, cerebrospinal fluid, urine, or a tissue biopsy.

13. The method of claim 1, further comprising lysing cells of the test sample prior to the step of hydrolyzing the proteins of the test sample.

14. The method of claim 1, wherein the step of hydrolyzing the proteins comprises contacting the proteins with an acid followed by drying the hydrolyzed proteins.

15. The method of claim 1, further comprising following the step of hydrolyzing the proteins, separating the product of the hydrolysis step; wherein the hydrolysis product examined according to the negative ion mode mass spectrometry analysis is a product of the separation.

16. The method of claim 15, wherein the separation comprises solid phase extraction.

17. The method of claim 1, wherein 2SC is not protein bound.

* * * * *